Sept. 4, 1951  F. E. SOELL  2,566,586
CANDY BAR FORMING MACHINE
Filed April 15, 1946  3 Sheets-Sheet 1
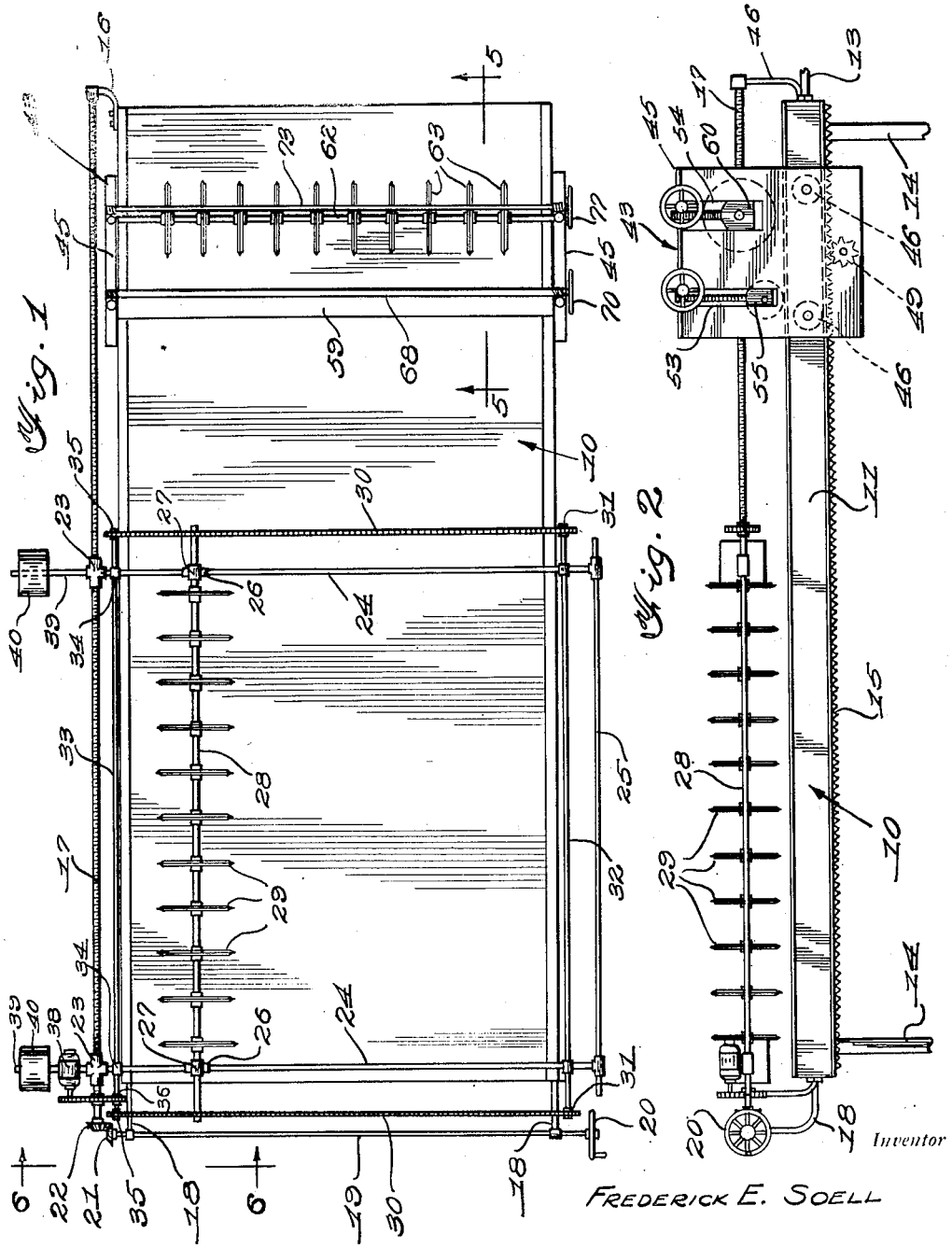
Inventor
FREDERICK E. SOELL
By Clarence A. O'Brien
and Harvey B. Jacobson
Attorneys

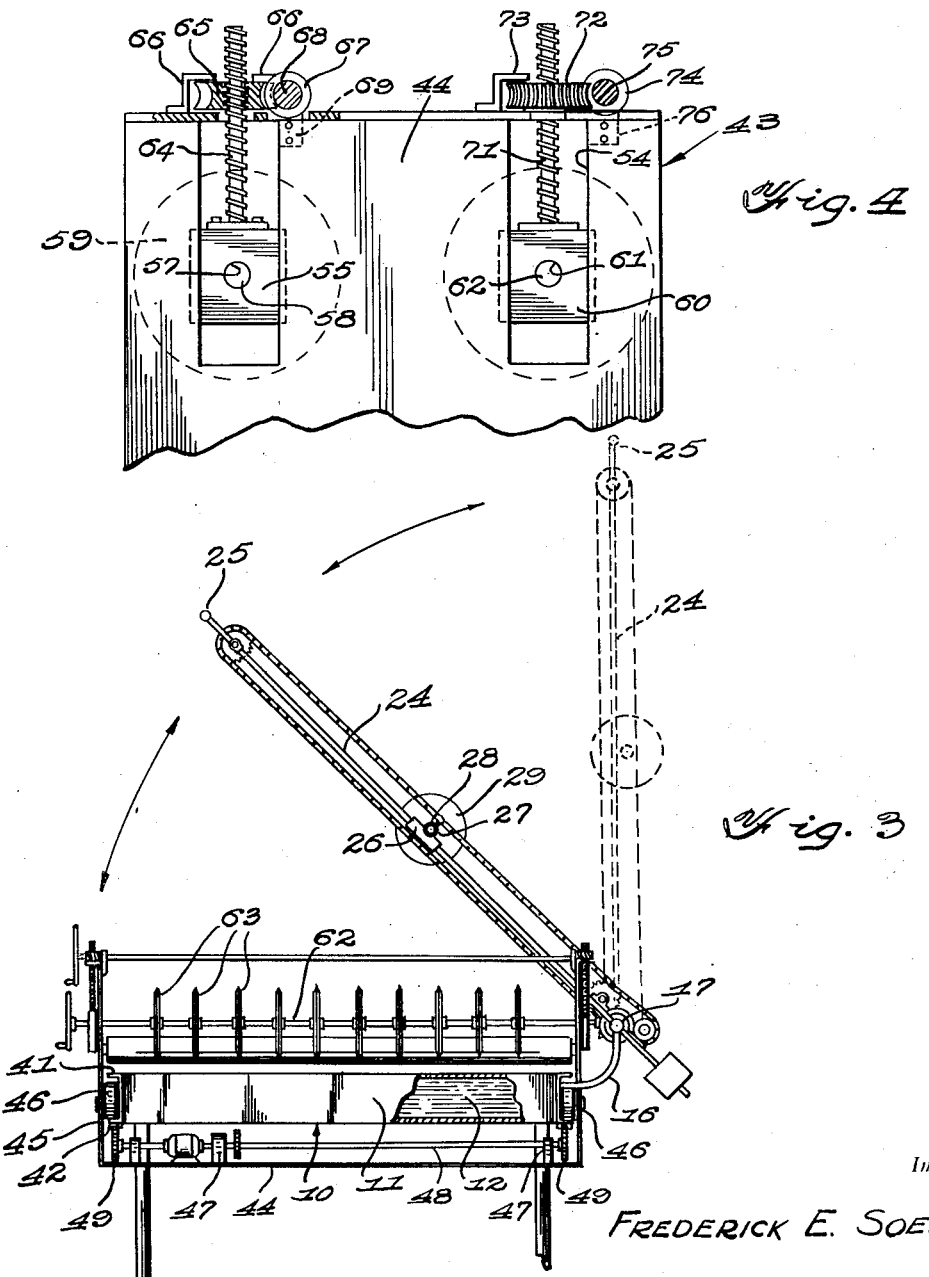

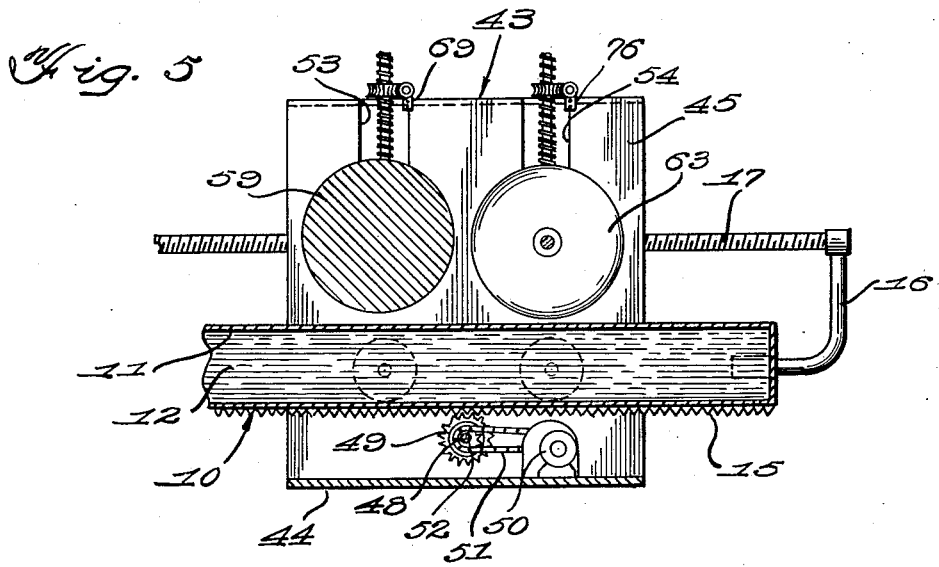
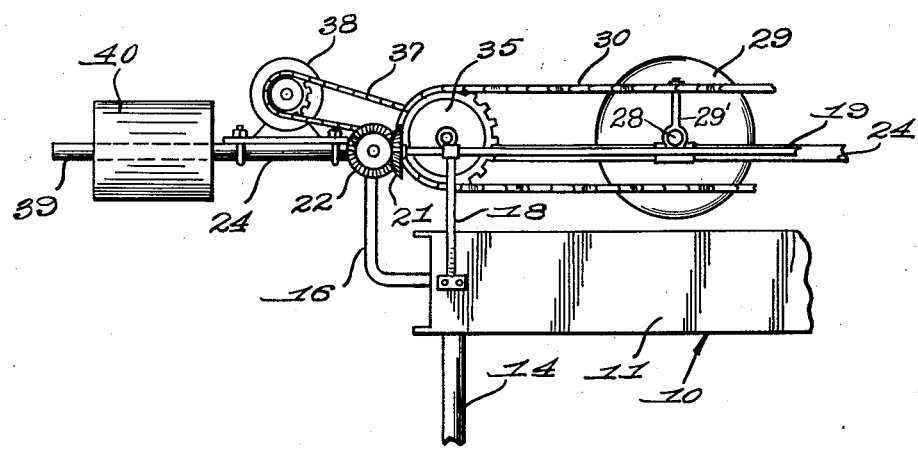

Patented Sept. 4, 1951

2,566,586

UNITED STATES PATENT OFFICE 2,566,586

CANDY BAR FORMING MACHINE

Frederick E. Soell, Estondale, Mass.

Application April 15, 1946, Serial No. 662,190

4 Claims. (Cl. 107—22)

This invention relates to a candy bar forming machine and more particularly to a machine for cutting a mass of candy into a plurality of separate pieces or bars.

The primary object of the invention is to support a mass of candy in the form of a flattened cake and to separate it into bars which may readily be disconnected one from the other.

Another object of the invention is to assure uniformity of the bar size so that each piece into which the mass is separated will contain exactly the same quantity as another piece.

Among its features my invention embodies a slab adapted to receive candy while it is heated and in a relatively fluid condition and to reduce the temperature of the candy on the slabs so as to increase its viscosity to facilitate the cutting of the mass into pieces or bars of predetermined size.

Other features include a carriage movable longitudinally of the slab and transversely spaced cutting discs on the carriage so that when the carriage is moved longitudinally the candy deposited on the slab will be cut lengthwise into strips of the desired width.

Other features include a tiltable carriage movable longitudinally of the slab and carrying transversely movable cutting discs by which the mass of candy on the slab may be cut transversely into bars of predetermined length.

In the drawings,

Figure 1 is a plan view of a candy bar forming machine embodying the features of this invention, Figure 2 is a front view of the machine illustrated in Figure 1, Figure 3 is an end view of the machine illustrated in Figure 1, Figure 4 is a fragmentary enlarged end view of the longitudinally movable carriage, Figure 5 is a fragmentary longitudinal sectional view taken substantially along the line 5—5 of Figure 1, and Figure 6 is a fragmentary enlarged detail view illustrating the carriage and operating mechanism for the transversely movable cutter wheels.

Referring to the drawings in detail, a slab designated generally 10 comprising an elongated hollow box-like structure 11 is adapted to contain a suitable conditioning liquid 12 which is circulated through the slab 10 through the medium of inlet and outlet pipes 13 which are connected to a suitable heat regulating device (not shown) for supplying fluid at the proper temperature to the slab. The slab 10 is preferably supported approximately table height on legs 14 and carries on its underside adjacent its forward and rear side edges rack bars 15, the teeth of which extend downwardly for meshing engagement with pinions to be more fully hereinafter described. Extending outwardly and upwardly from the rear side edge of the slab 10 are supporting brackets 16 in which a longitudinally screw threaded shaft 17 is journalled. Brackets 18 are attached to one end of the slab 10 and extend upwardly and outwardly therefrom for rotatably supporting a shaft 19 carrying at the forward end a hand wheel 20 and at its rear end a bevel pinion 21 which has meshing engagement with a bevel pinion 22 secured to one end of the shaft 17. It will thus be seen that when the hand wheel 20 is rotated the shaft 17 will likewise be rotated.

Mounted on the shaft 17 are internally threaded spaced sleeves 23 from which extend perpendicular guide bars 24, which as shown in Figure 1 extend transversely across the slab 10 and are held in spaced parallel relation by means of a handle bar 25 which lies substantially parallel to the front edge of the slab 10. Mounted for longitudinal sliding movement on the guide bars 24 are sleeves 26 carrying journal bearings 27 in which a shaft 28 which extends parallel to the handle bar 25 is rotatably mounted. This shaft is provided at spaced intervals with cutting discs 29 which when the frame composed of the bars 24 and 25 is lowered are moved into close proximity to the top of the slab as will be readily appreciated upon reference to Figure 2. Opposite ends of the shaft 28 are journalled in ring-shaped brackets 29' carried by the upper runs of endless chains 30 which are supported at one end of the frame formed by the bars 24 and 25 on idler sprockets 31 carried on a supporting shaft 32 which extends in parallel relation to the handle bar 25. A drive shaft 33 is rotatably supported in suitable bearings 34 carried by the bars 24 near the sleeves 23 and secured to opposite ends of this shaft 33 are sprockets 35 having driving connection with the chains 30. A drive sprocket 36 is mounted on the shaft 33 near one end and has driving connection with a chain 37 which in turn is driven through the medium of a sprocket attached to the drive shaft of a prime mover 38. It will thus be seen that when the prime mover 38 is set into operation the chains 30 will be driven to move the shaft 28 along the guide bars 24. The prime mover 38 is preferably of the reversible type, such as a reversible electric motor so that when the shaft 28 has been moved across the slab 10 it may be returned to its original position by reversing the direction of motion of the prime mover. Carried on the sleeves 23 in alignment with the guide bars 24 but extending rearwardly with relation to the slab 10 are supporting bars or arms 39 upon which counterbalance weights 40 are adjustably secured. These weights 40 are so adjusted on the arms 39 as to effectively counterbalance the frame comprised of the guide bars 24 and handle bar 25 with the accessories mounted thereon so that the frame may be tilted as illustrated in Figure 3 by grasping the handle bar 25 and lifting it to the desired position.

As illustrated in Figure 3 the side bars of the slab 10 are formed of channels having their flanges turned outwardly to form spaced parallel upper and lower guides 41 and 42. A carriage designated generally 43 comprises a bottom or bridge member 44 rising from opposite ends of which are standards 45. This bridge member extends transversely of the slab 10 below the underside thereof and rotatably supported on the standards 45 are rollers 46 which are adapted to ride in the channels between the guide flanges 41 and 42 as will be readily understood upon reference to Figure 3. Journalled in suitable brackets 47 carried by the bridge member 44 is a transversely extending shaft 48 carrying at opposite ends pinions 49 which are adapted to mesh with the rack bars 15 previously referred to. A reversible prime mover 50 has driving connection through the medium of a chain 51 and sprockets 52 with the shaft 48 so that when the prime mover is set into operation the shaft will be driven and cause the pinions 49 to rotate so as to move the carriage 43 longitudinally of the slab 10.

Extending inwardly from the upper end of each standard 45 are vertically disposed spaced parallel slots 53 and 54. Slidably mounted in each slot 53 is a vertically movable carriage or cross head 55 and these cross heads are provided with aligning openings 57 for the reception of trunnions 58 formed at the opposite ends of a roller 59. Similar cross heads 60 are mounted for vertical sliding movement in the slots 54 and these cross heads are provided with aligning openings 61 in which a shaft 62 is rotatably supported. This shaft 62 is provided with longitudinally spaced cutter discs 63 which are adapted to be adjusted vertically so that their peripheries may approach the top surface of the slab 10. Vertical adjustment of the cross heads 55 is secured by attaching to each cross head a vertically extending screw-threaded stud 64 which extends upwardly through a nut 65 held adjacent the upper edge of its respective standard 44 by means of a suitable cage 66. The nut is preferably formed with peripheral teeth for meshing engagement with worms 67 mounted adjacent opposite ends of a shaft 68 which in turn is mounted for rotation in bearings 69 carried by the standards 44. A hand wheel 70 is attached to one end of the shaft 68 so that upon turning the shaft, the nuts 65 will be turned and thereby cause the roller 59 to be raised or lowered according to the direction of movement of the shaft 68.

Attached to the upper edge of each cross head 60 is a vertically extending screw-threaded stud 71 which like the stud 64 meshes with internal screw threads formed in a nut 72 which is held in proper position on the upper edge of its respective standard 44 by a suitable cage 73. Like the nut 65 the nut 72 is provided with peripheral teeth for meshing engagement with worms 74 carried adjacent opposite ends of a shaft 75 which is rotatably supported in suitable bearings 76 carried at the upper edge of each standard 44. The shaft 75 is provided at one end with a hand wheel 77 so that upon turning the hand wheel the shaft will be rotated to cause the worm wheels or nuts 72 to raise or lower the shaft 62 and move the discs 63 carried thereby toward or away from the upper surface of the slab 10. It will thus be seen that the depth of cut made in a mass of candy deposited on the slab 10 may be governed to suit varying conditions.

In operation it will be understood that a mass of fluid candy is deposited on the slab 10 and its viscosity is regulated by governing the heat of the liquid 12 contained in the slab. When the mass of candy has attained the desired consistency, or viscosity the frame defined by the guide bars 24 and the handle bar 25 is elevated as illustrated in Figure 3 and the prime mover 50 is then set into motion to cause the carriage 43 to move longitudinally of the slab. As the carriage advances and approaches the mass of candy deposited on the slab the roller 59 will first contact the mass of candy to flatten it to the desired thickness, it being understood that the thickness of the candy mass may be determined by adjusting the roller 59 through the medium of the hand wheel 70. The cutter discs 63 are then adjusted vertically by turning the hand wheel 77 to bring their peripheries into proper relation to the top of the slab 10. Continued movement of the carriage 43 will cause the cutter discs to form incisions in the candy mass along which it may be parted. Upon completing the longitudinal incisions in the candy mass the direction of movement of the prime mover 50 is reversed so as to cause the carriage 43 to return to the starting point. The frame defined by the guide bars 24 and the handle bar 25 is then swung about the shaft 17 to bring the peripheries of the cutter discs 28 into proper relation to the surface of the slab and the prime mover 38 is then set into motion to cause the shaft 28 to advance across the slab 10 to make transverse incisions in the candy mass. In order to enable the entire mass of candy to be provided with the transverse incisions the carriage defined by the bars 24 and 25 is thrown into the dotted line position in Figure 3 and the hand wheel 20 is rotated to shift the sleeves 23 longitudinally of the shaft 17 until the desired position is reached. The prime mover 38 is then again energized to cause the shaft 28 and cutter wheel 29 to advance across the slab 10 to provide additional transverse incisions in the candy mass. In this way it will be evident that the bars formed by the incisions in the candy mass will be of uniform size depending upon the positions of the cutter wheels on their respective shafts.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A candy bar forming machine which includes a hollow slab adapted to support a batch of candy while the latter is in a heated and fluid condition, means to circulate fluid through the slab to regulate the temperature of the candy so as to produce in it a viscous condition that will enable the candy to be cut into separate pieces, a carriage movable longitudinally of the slab, laterally spaced cutting discs carried by the carriage for making longitudinal incisions in candy on the slab when it has attained the desired viscous condition, a screw shaft carried by the slab near one longitudinal side edge thereof, a tiltable carriage movable longitudinally on the screw shaft, spaced cutting discs mounted on the tiltable carriage for movement in unison transversely of the slab for making transverse incisions in the candy, and means carried by the tiltable carriage for moving in unison the cutting discs carried thereby.

2. A candy bar forming machine which includes a hollow slab adapted to support a batch of candy while the latter is in a heated and fluid condition, means to circulate fluid through the slab to regulate the temperature of the candy so as to produce in it a viscous condition that will enable the candy to be cut into separate pieces, a carriage movable longitudinally of the slab, laterally spaced cutting discs carried by the carriage for making longitudinal incisions in candy on the slab when it has attained the desired viscous condition, a screw shaft carried by the slab near one longitudinal side edge thereof, a tiltable carriage movable longitudinally on the screw shaft, spaced cutting discs mounted on the tiltable carriage for movement in unison transversely of the slab for making transverse incisions in the candy, and means operable from one side of the slab for shifting the tiltable carriage longitudinally of the slab.

3. A candy bar forming machine comprising a hollow substantially rectangular slab adapted to support a batch of candy adjacent one end thereof, means to circulate a heated fluid through said slab to keep the candy in a viscous state, a first carriage mounted on and adjacent the other end of said slab, laterally spaced cutting discs carried by said first carriage for making longitudinal incisions in the candy, means for moving said first carriage longitudinally of said slab towards and away from said one end of said slab, a second carriage, means for tiltably mounting said second carriage on one side of said slab, spaced discs carried by said second carriage for making transverse incisions in the candy, and means for moving said spaced discs in unison towards and away from the opposite side of said slab, said second carriage including a rectangular frame having interconnected side and end members, said means for tiltably mounting said second carriage including a longitudinal, externally threaded rod mounted on said one side of said slab and internally threaded sleeves at one of the corresponding ends of said end members received on said threaded rod.

4. The combination of claim 3 and a means for adjustably moving said second carriage longitudinally of said slab towards and away from said other end of said slab to vary the position of the transverse incisions in the candy, said last-named means including a first beveled gear carried at one end of said threaded rod, a shaft extending parallel to said side members of said second carriage and rotatably mounted on said one end of second slab, a second beveled gear on one end of said shaft engaging said first beveled gear, and a handle on the other end of said shaft for rotating the same.

FREDERICK E. SOELL.

REFERENCES CITED

The following references are of record in the file of this patent:

UNITED STATES PATENTS

| Number | Name | Date |
|--------|------|------|
| 42,680 | Murtha | May 10, 1864 |
| 304,655 | Kirchhoff | Sept. 2, 1884 |
| 432,937 | Glynn | July 22, 1890 |
| 1,839,969 | Kazanji | Jan. 5, 1932 |
| 2,225,106 | Franke | Dec. 17, 1940 |
| 2,279,420 | Thum | Apr. 14, 1942 |
| 2,356,872 | Monaco | Aug. 29, 1944 |